US 9,797,372 B2

(12) United States Patent
Iqbal

(10) Patent No.: US 9,797,372 B2
(45) Date of Patent: Oct. 24, 2017

(54) SELF-DIRECTED VERTICAL AXIS WIND TURBINE

(71) Applicant: Muhammad Muzaffar Iqbal, Brampton (CA)

(72) Inventor: Muhammad Muzaffar Iqbal, Brampton (CA)

(*) Notice: Subject to any disclaimer, the term of this patent is extended or adjusted under 35 U.S.C. 154(b) by 127 days.

(21) Appl. No.: 14/955,040

(22) Filed: Dec. 1, 2015

(65) Prior Publication Data

US 2016/0208775 A1 Jul. 21, 2016

(30) Foreign Application Priority Data

Jan. 15, 2015 (CA) .................................... 2878631

(51) Int. Cl.
*F03D 3/04* (2006.01)
*F03D 3/06* (2006.01)
*F03D 3/00* (2006.01)

(52) U.S. Cl.
CPC .............. *F03D 3/04* (2013.01); *F03D 3/005* (2013.01); *F03D 3/068* (2013.01); *F05B 2240/302* (2013.01); *Y02E 10/74* (2013.01)

(58) Field of Classification Search
CPC . Y02E 10/74; F03D 3/005; F03D 3/04; F03D 3/068; F05B 2240/302
See application file for complete search history.

(56) References Cited

U.S. PATENT DOCUMENTS

| | | | | |
|---|---|---|---|---|
| 614,812 A * | 11/1898 | Keeney | ...................... | F03D 3/00 416/50 |
| 1,850,721 A * | 3/1932 | Katzenberger | .......... | F03D 3/065 416/52 |
| 4,818,888 A * | 4/1989 | Lenoir, III | ............ | F03B 17/065 290/43 |
| 5,098,264 A * | 3/1992 | Lew | .......................... | F04C 2/44 416/119 |
| 6,629,815 B2 * | 10/2003 | Lusk | ....................... | F03D 3/005 415/4.2 |
| 7,550,865 B2 * | 6/2009 | Jonsson | ................... | F03D 3/068 290/42 |
| 8,076,791 B2 * | 12/2011 | Hostetler | .............. | F03B 17/067 290/54 |
| 8,459,949 B2 * | 6/2013 | Lee | .......................... | F03D 3/02 415/4.2 |
| 8,531,052 B1 * | 9/2013 | Simnacher | .............. | F03D 3/002 290/54 |
| 2012/0134824 A1 * | 5/2012 | Agtuca | ................... | F03D 3/005 416/142 |

* cited by examiner

*Primary Examiner* — Michael Zarroli

(57) ABSTRACT

The invention provides a vertical axis wind turbine to produce power relative to wind speed resulting in high torque output. During operation, all the blades of the turbine are in a continuous movement of changing their angles from fully open to fully overlap position during each rotation. At the heart of this concept is a frame circumventing the rotor, formed of a pair of top coaxial rings superimposed over bottom coaxial rings defining a central vertical axis distant from the shaft axis, each pair of top and bottom rings are freely movable by being mounted on bushings to the shaft by radially disposed beams and vertically disposed mounting members fixedly connecting the top and bottom rings. The Blade angle relative to incoming wind is controlled by these pair of rings which are controlled by the pair of weather-vanes rotating on the central turbine shaft axis.

8 Claims, 9 Drawing Sheets

Top view ( conceptual )
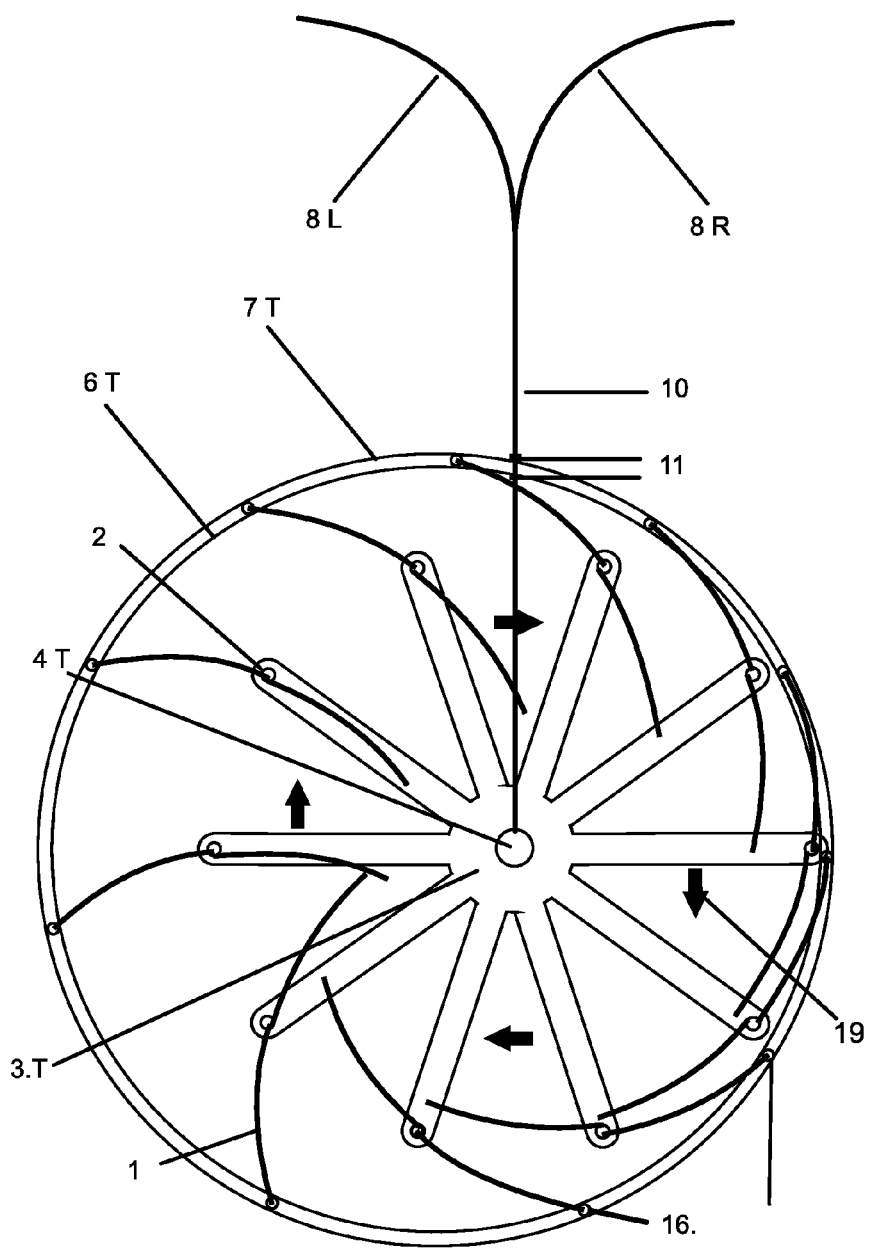
FIG.2
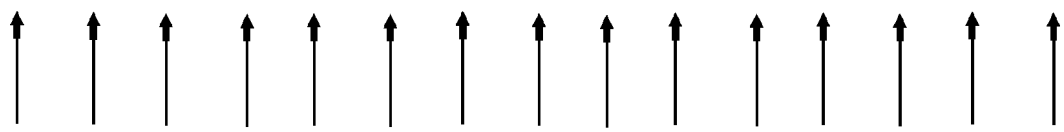

Perspective view of turbine central shaft, top and bottom flanges with radial arms with bushings to hold 10 blades

SELF-DIRECTED VERTICAL AXIS WIND TURBINE

BACKGROUND OF THE INVENTION

Vertical Axis Wind Turbines have been in use for a very long time, new technology and materials have played a big part to overcome the deficiencies and improve torque output from VAWT but work to improve the output torque is continuing and heading in the right direction.

Some previous patent citations are mentioned below:

| | |
|---|---|
| US20030161729 | Hank Lindhorn |
| WO2004079186A2 | Robert D Hunt |
| WO2004109097A1 | Willi Henkenhaf |
| WO2012007630A1 | Andreu J M Juan |
| WO2005100782A1 | John Edward Mullenger |
| WO2007129049A1 | David Mcsherry |
| EP1096144A2 | Miyake Kazuya |

This Self-directed Vertical Axis Wind Turbine is capable of holding its blade angle in a positively controlled and pre calculated angle while rotating against the in-coming wind to produce the optimum power relative to wind speed resulting in additional torque output compared to other similar size of vertical axis wind turbines.

SUMMARY OF THE INVENTION

This Self-directed Vertical Axis Wind Turbine can consist of any number of blades with a minimum of three which should be decided based on average wind speed where the turbine is supposed to be installed. Smaller number of blades and large surface area in low wind speed and larger number of blades with relatively smaller surface area in high wind speed. This will reduce stalling, typically seen in vertical axis wind turbines.

In the shown example, the number of blades is chosen to be 10 for average wind speed conditions. This turbine consist of ten elongated blades with concave curvature to be facing the in-coming wind, the face of the blade is maintained positively in this manner for about 120 degrees of the total blade rotating path namely the Open Zone in the required direction facing the in-coming wind. This is achieved by the help of two pairs of coaxial rings, one on the top and second at the bottom of the blades holding the outside corner pins of each blade, the pins are mounted with weather proof sealed bearings to travel inside the coaxial rings guided on both inner and outer sides to reduce friction, the bearing position inside the coaxial rings will dictate the angle of the blade with reference to in-coming wind direction.

Each blade is pivoted from center at top and bottom by the help of two pivot pins inserted in suitable bushing in the top and bottom flange radial arms, this lets each blade move within 90 degrees on their vertical center axis but controlled by the coaxial rings.

The bearing and coaxial rings position in relation to the pivot pin in the flange radial arm bushing controls the force produced by each blade during the 360 degree movement on the prescribed path between the pair of coaxial rings.

The two pairs of coaxial rings are held together by a fabricated frame assembly, parts of the assembly are also two extended members mounted with three weathervanes on each. These set of weathervanes consist of one straight vane and two curved vanes inverse to each other. The in-coming wind force pushes the weathervanes in line with the in-coming wind. This movement provides the coaxial rings to remain in a position to produce optimum force by the blades. This complete fabrication assembly which includes the top and bottom coaxial rings and top and bottom sets of weathervanes, is connected and mounted to the central turbine shafts by two sealed weather proof bearings, one in the top flange and other in the bottom flange making the assembly to be able to rotate freely on the central turbine shaft as the wind direction dictates.

The path for coaxial rings follower bearings is divided in 4 sections. The first where the blades produce optimum force to be named as Open Zone which is about 120 degrees of the total 360 degree movement. Exactly opposite to this 120 degree of the rotation path where the blades are forced to nearly overlap each other is named as the Closed Zone thus reducing reverse force of the in-coming wind when the blades are moving against it.

The rest of the 120 degree of rotation path is divided in two equal 60 degrees zones located opposite to each other where the state of blade are switched from open to close or other way around. These are named as Open to Close Zone and Close to Open Zone.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF THE DRAWINGS

Figure 1:
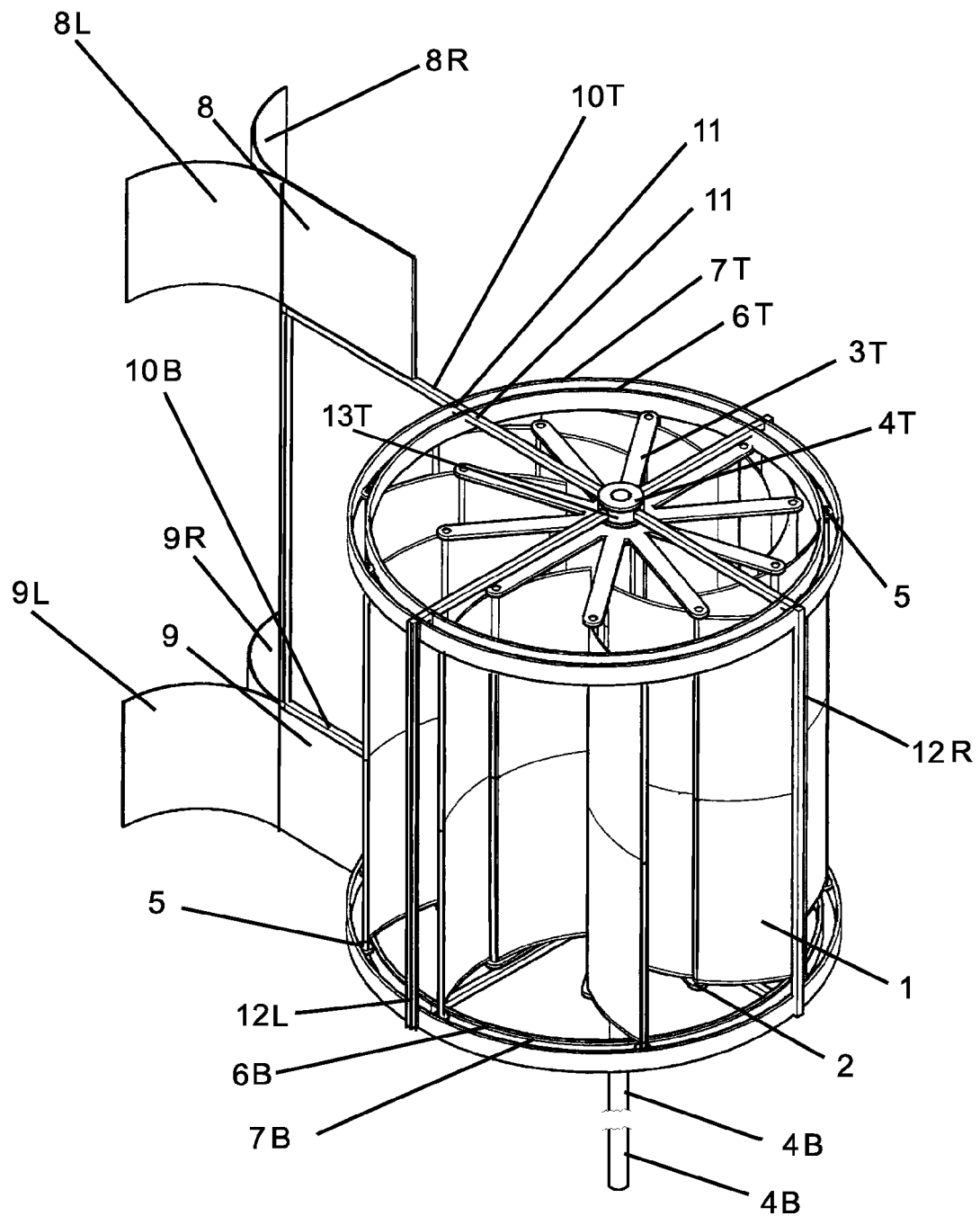
FIG. 1 South west isometric view of this Self-directed vertical axis wind turbine showing details and part numbers FIG. 2 Top view showing concept details of this Self-directed Vertical Axis Wind Turbine FIG. 3 South west isometric view of upper and lower coaxial rings, weathervanes and bearing housings of this Self-directed Vertical Axis Wind Turbine FIG. 4 Perspective view of the ten turbine blades with coaxial rings follower bearings and pivot pins of this Self-directed Vertical Axis Wind Turbine FIG. 5 Perspective view of central turbine shaft, top and bottom flanges with radial arms and bushings to hold the ten blades of this Self-directed Vertical Axis Wind Turbine FIG. 6 South west isometric view of bottom pair of coaxial rings, coaxial rings follower bearings and partial view of blades of this Self-directed Vertical Axis Wind Turbine FIG. 7 South east isometric view of one turbine blade with coaxial rings follower bearings and pivot pins of this Self-directed Vertical Axis Wind Turbine FIG. 8 Top view showing inner wall of coaxial ring, outer wall of coaxial ring, 10 blades, 10 coaxial rings follower bearings, ten blade pivot pins and arrows indicating blade rotation direction of this Self-directed Vertical Axis Wind Turbine FIG. 9 Top View showing the turbine's 4 zones of this Self-directed Vertical Axis Wind Turbine where the output force level changes in each zone

Self-directed Vertical Axis Wind Turbine of FIG. 1 is capable of holding its blade angle in a positively controlled and pre-calculated direction while rotating against the in-coming wind to produce the optimum power relative to wind speed resulting in additional torque output compared to similar size of vertical axis wind turbines. All the blades of the turbine are in a smooth and continuous movement of changing their angles from fully open to fully overlap position during each 360 degree rotation of turbine. There are no sudden stops or start points in this angle changing process.

FIG. 1, Part. 1 is the turbine blade, ten in numbers. Part. 2 top and bottom turbine blade pivot pins, 20 in numbers, 2 on each blade in the top and bottom flanges with radial arms given numbers as Part. 3T and 3B. Part. 4T and 4B are the two ends of the central turbine shafts. Part. 5. 20 in numbers, 2 on each blade are the pins mounted at the top and bottom edge of each blade for mounting the coaxial rings follower sealed bearings. Part. 6T and 6B are the inner coaxial rings walls. Part. 7T and 7B are the outer walls of the top and bottom coaxial rings. Part. 8 is the top straight vane. Part. 8L and 8R are the two top curved vanes. Part. 9 is the bottom straight vane. Part. 9L and 9R are the two bottom curved vanes. Part. 10T is the top vane mounting member. Part. 10B is the bottom vane mounting member. Part. 11 is the welded connection of top coaxial rings and vane mounting member. Part. 12L, 12F & 12R are vertically disposed mounting members connecting the top and bottom coaxial rings. Part. 13T is the top bearing housing holding the coaxial rings and weathervanes assembly.

FIG. 2 Top view Conceptual is self explanatory as it is numbered appropriately. The array of arrows indicate the wind direction.

Figure 3:
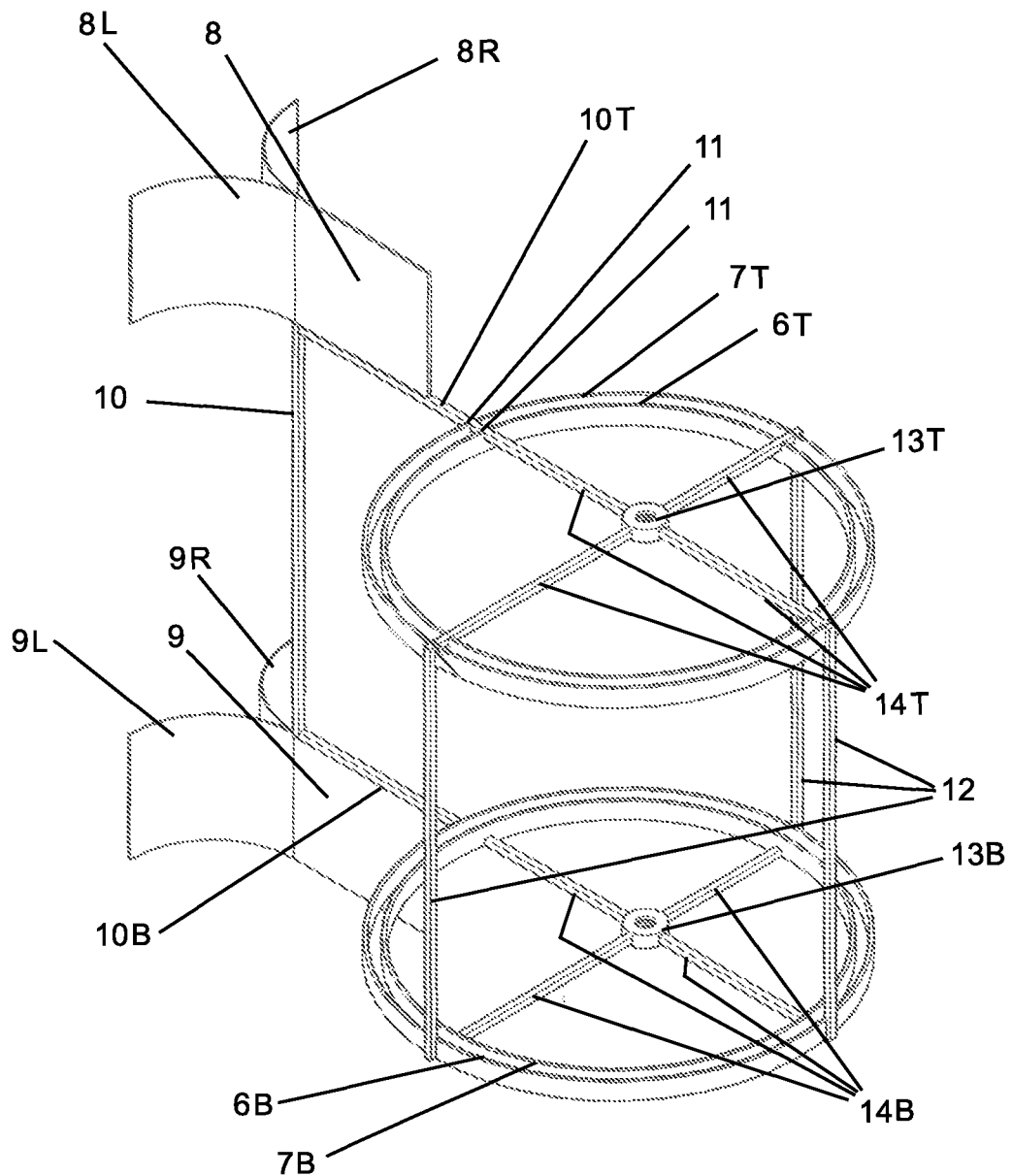

FIG. 3 Shows details of the top and bottom pairs of coaxial rings that are 6T, 7T and 6B, 7B. Top weathervanes 8, 8L & 8R, bottom weathervanes 9, 9L and 9R. Part 10 and 12 are vertically disposed mounting members connecting upper and lower pairs of coaxial rings. The following parts are not described in FIG. 1: Part. 13T and 13B are the top and bottom bearing housings. Part. 10T, 10B, 14T and 14B are radially disposed beams of this assembly holding the bearing housings joined with the top and bottom pairs of coaxial rings.

Figure 4:
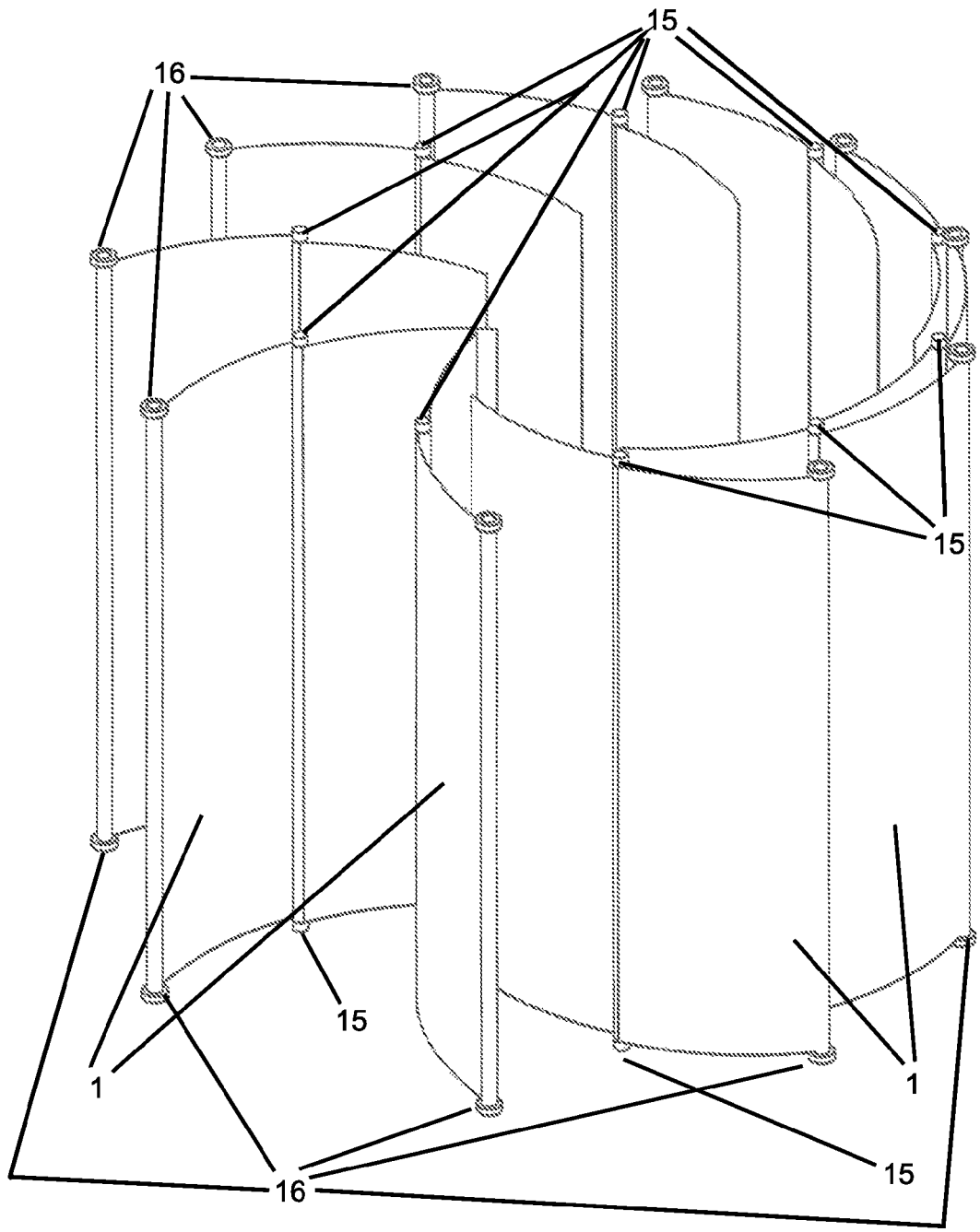

FIG. 4 Shows perspective view of all ten blades only two are numbered as Par 1, Part. 15 are the 20 pivot pins, two on each blade to be inserted in top and bottom flange radial arm bushings. Part. 16 are the 20 coaxial rings follower sealed bearings, two on each blade. The blades are shown with fabrication assembly removed. The open, semi closed, the closed and semi open blades are clearly visible in their respective positions.

Figure 5:
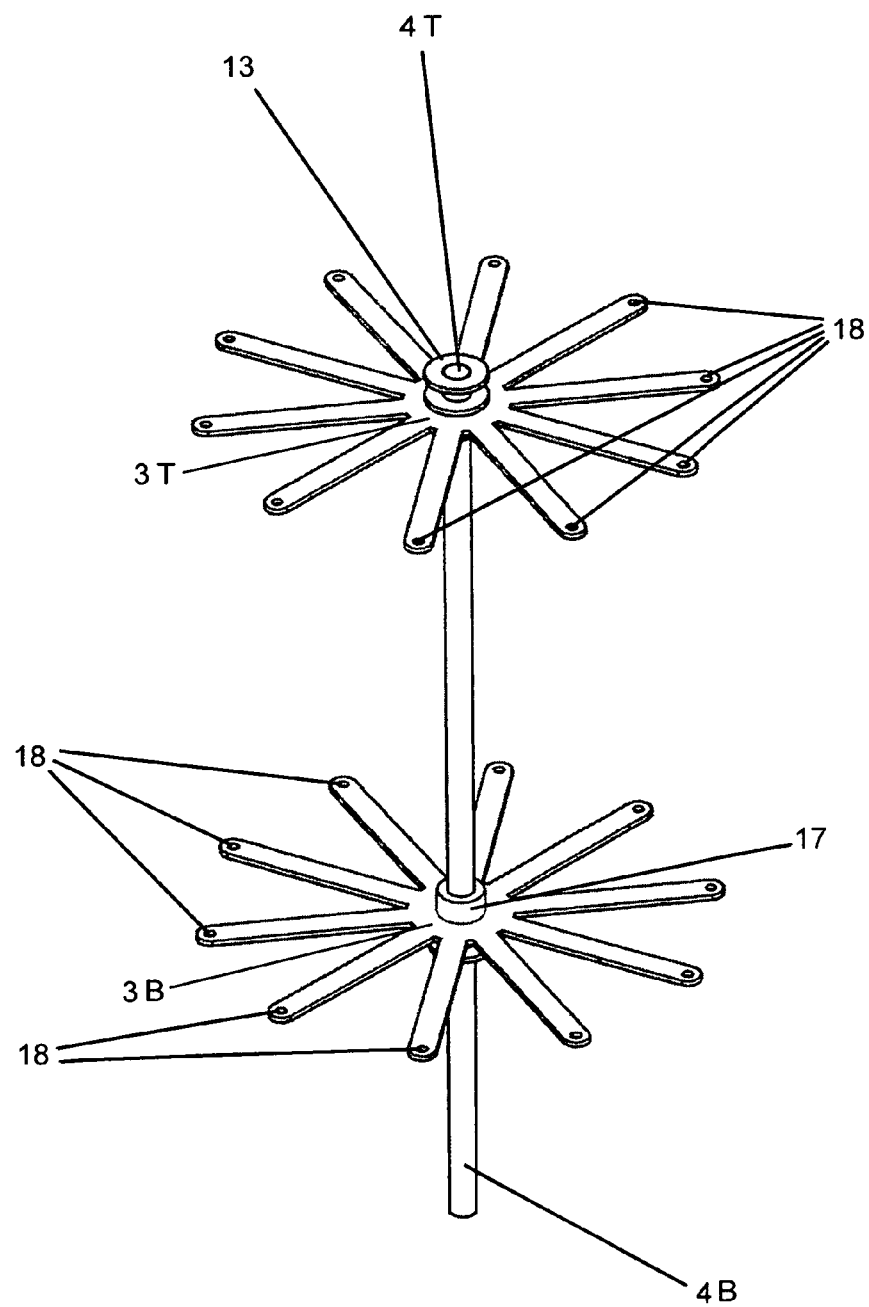

FIG. 5 Shows the perspective view of the central turbine shaft with top and bottom flanges with radial arms. Part. 3T and 3B are the top and bottom flanges with 10 radial arms on each. Part. 4T and 4B are the top and bottom of central turbine shaft. Part. 17 is the welded boss on bottom flange, the top flange also has a welded boss which is not visible in this drawing. Part. 18 are the 20 bushings, ten on each flange to accommodate the pivot pins, two on each blade.

Figure 6:
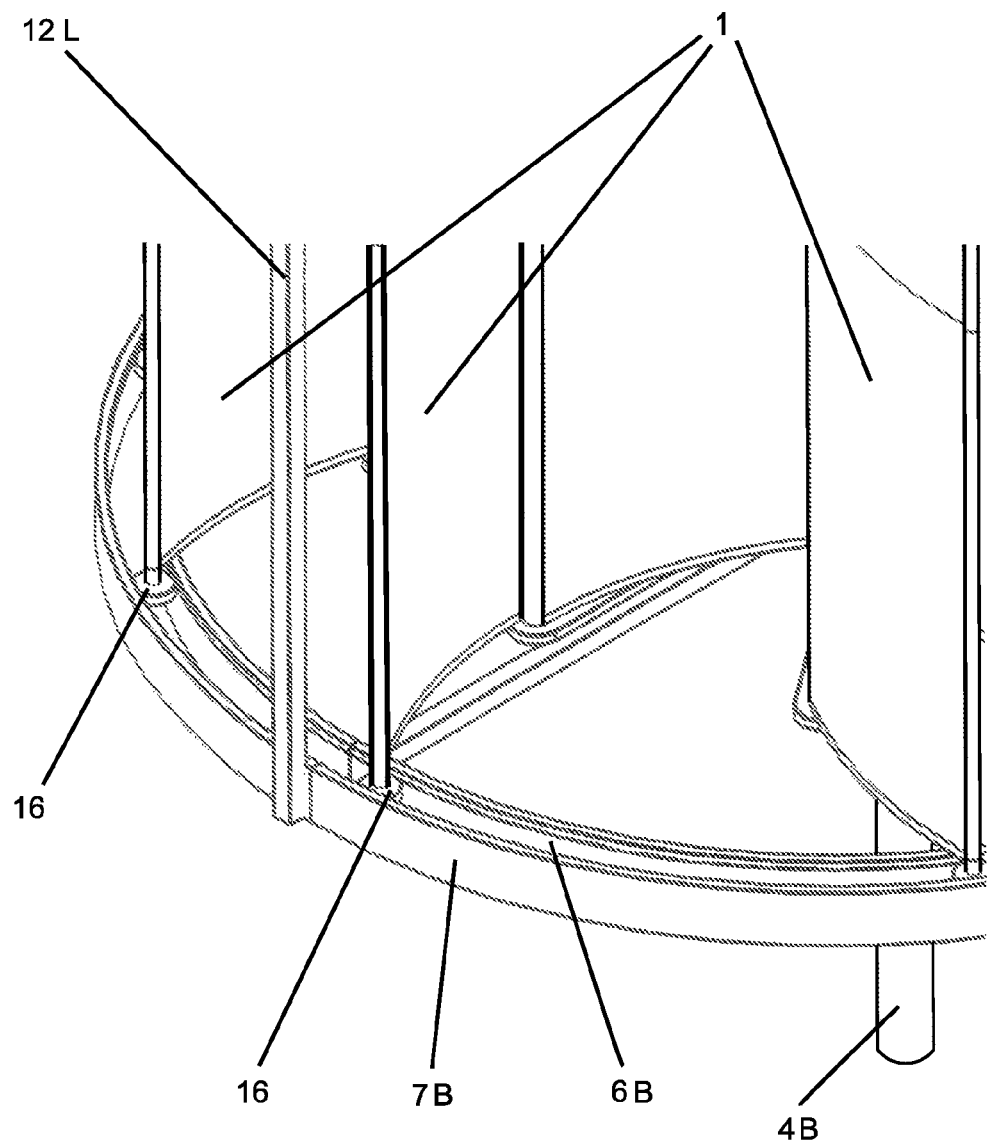

FIG. 6 Shows south west isometric view of the lower pair of coaxial rings. Part 1 is a partial view of 3 turbine blades. Part. 4B is the lower end of the central turbine shaft, this shaft will be extended to become the main mounting member for the turbine as well as to be connected to the power generating source which could be an electric generator or a mechanical device. Part. 6B and 7B are the coaxial rings walls. Part. 12 L is the vertically disposed mounting member connecting the top and bottom coaxial rings. Part. 16 are coaxial rings follower sealed bearings.

Figure 7:
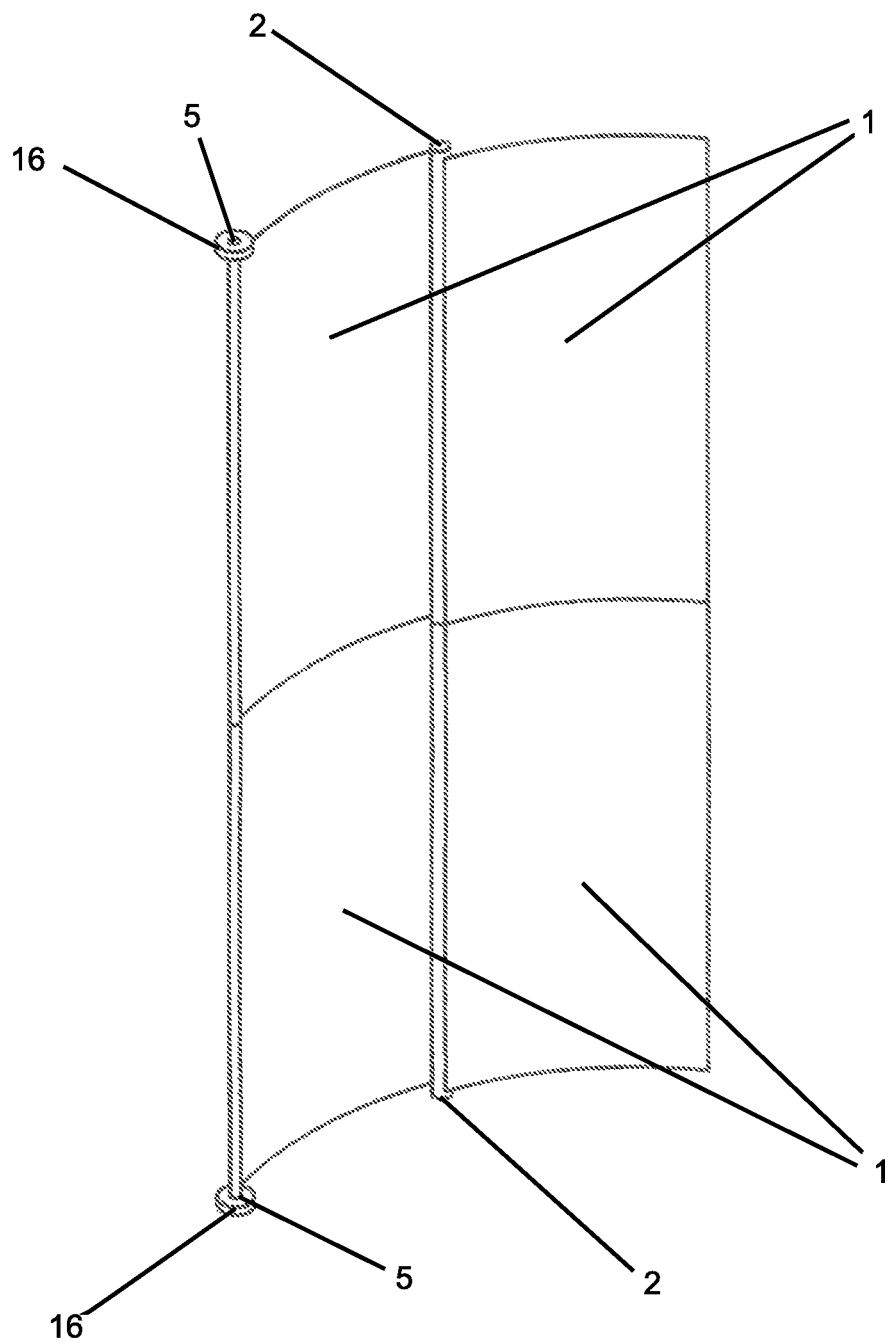

FIG. 7 Shows details on one turbine blade as bold lines that is Part. 1. Part. 2 are the pivot pins, two on each blade. Part. 5 are bearing mounting pins, two on each blade. Part. 16 are the coaxial rings follower bearings, 2 on each blade.

Figure 8:
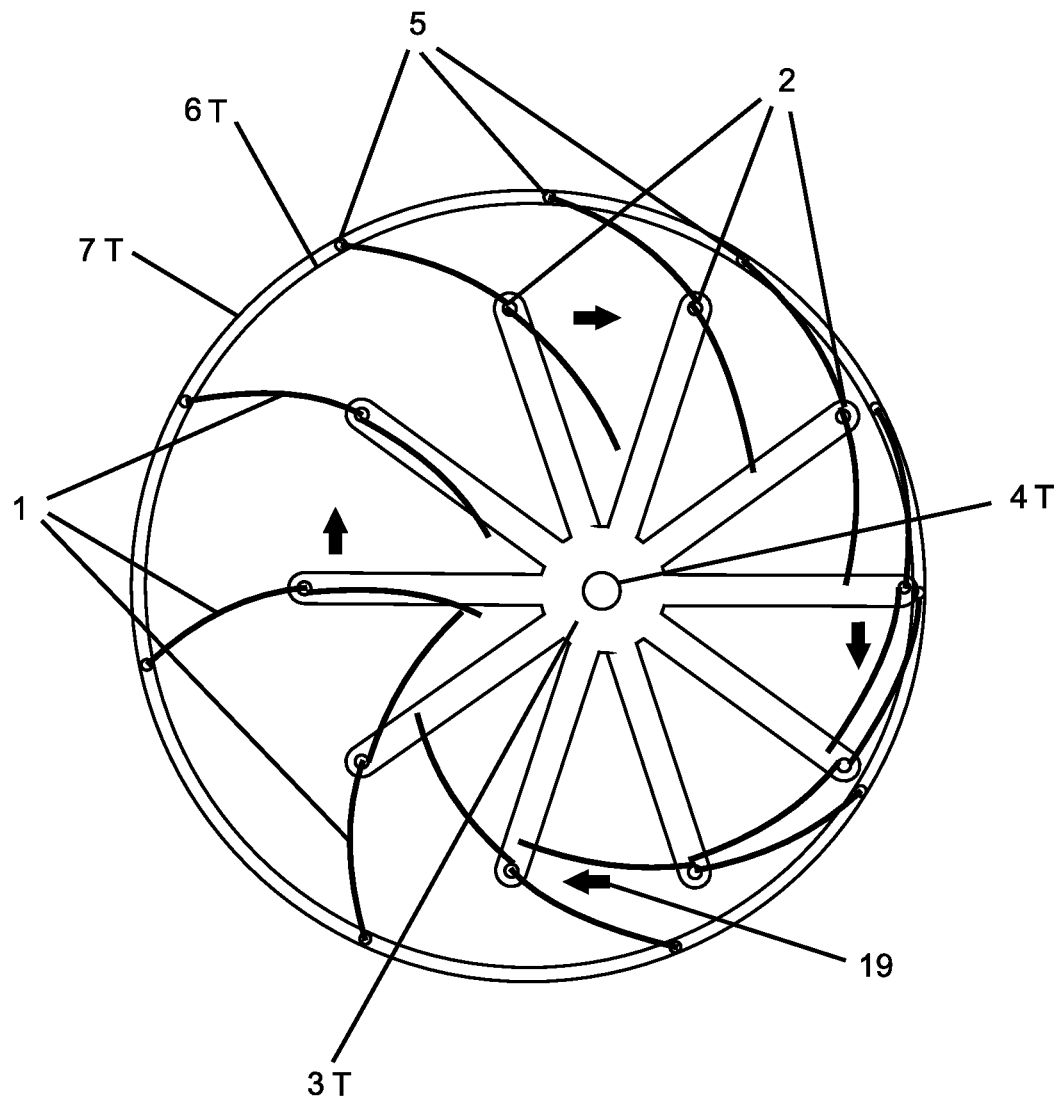

FIG. 8 Shows top view of the blades Part. 1. Blade pivot pins Part. 2. Part 3T is the top flange radial arms. 4T is the top end of central turbine shaft. Part. 5 are pins to mount coaxial rings follower sealed bearings. Part. 6 T and 7T are the inner and outer walls of coaxial rings. Part. 19 are arrows indicating the turbine's rotation direction.

Figure 9:
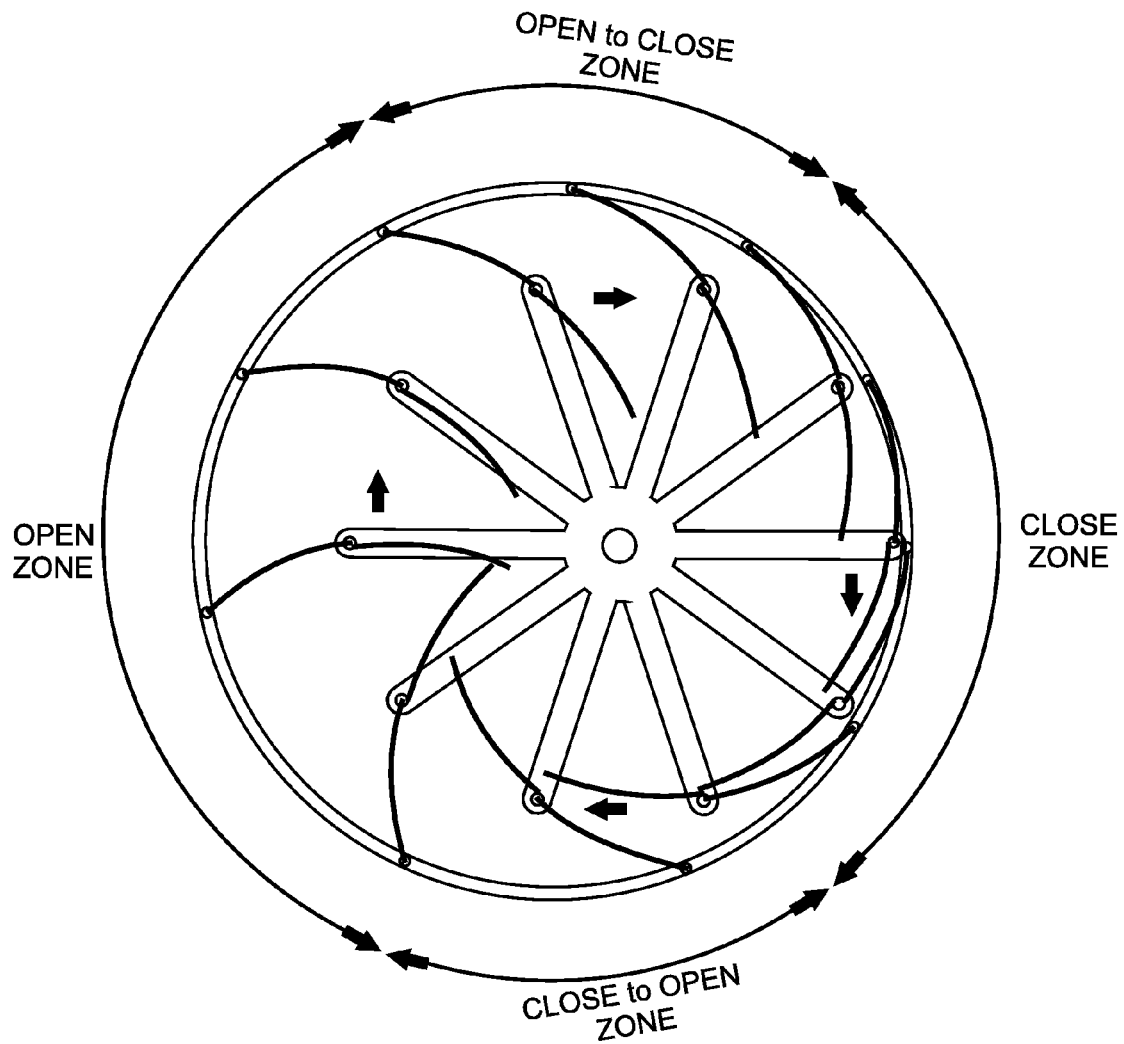

FIG. 9 Shows the 4 zones where the Open Zone produces max torque, Close Zone produces minimum torque and the other two zones, Open to Close and Close to Open produce relatively lower torque. An array of arrows shows the in-coming wind direction.

What is claimed is:

1. Self-directed Vertical Axis Wind Turbine comprising:
    a rotor comprising a vertical central shaft, said shaft having a top end and a bottom end wherein adjacent to each end of the shaft is fixedly mounted a flange having radially extending arms equally distant from one another;
    each said arm is provided with a hole at a radial end;
    a plurality of vertically disposed concave blades facing the wind, when in operation, each blade defining a central longitudinal axis midway between a proximal edge located adjacent the shaft and a distal edge, each blade is pivotable by having a central pivot pin at the top and bottom ends coaxial with the longitudinal axis for mounting in the hole of a corresponding arm of the top and bottom flanges;
    a plurality of bushings, wherein each bushing is mounted to a pin at the top end and bottom end of distal edge of each blade;
    a frame circumventing the rotor, formed of a pair of top coaxial rings superimposed over bottom coaxial rings defining a central vertical axis distant from the shaft axis, each pair of top and bottom rings are mounted on bushings to the shaft by radially disposed beams and vertically disposed mounting members fixedly connecting the top and bottom rings;
    said top rings located adjacent the blade distal edge top end and said bottom rings located adjacent the blade distal edge bottom end, wherein the bushing of each respective distal edge top end is located in a predetermined gap between the top rings and the bushing of each respective distal edge bottom end is located in a predetermined gap between the bottom rings; and
    a weathervane comprising of a pair of back-to-back plates of opposite curves connected to a straight plate mounted to an horizontal member radially extending from the frame, whereby wind force acting on the weathervane rotates the frame about the shaft axis such that about half of the blades, facing the wind, are fully open by virtue of the rings acting on the blade edge bushings to produce power and the about other half of blades, facing the wind, are closed by the rings acting on the blade edge bushings for least resistance to wind force.

2. Self-directed Vertical Axis Wind Turbine of claim 1, is capable of holding all the blades at a controlled and pre-calculated angle while rotating against the in-coming wind to produce the optimum power relative to wind speed resulting in additional torque output.

3. Self-directed Vertical Axis Wind Turbine of claim 1, all the blades of the turbine are in a continuous movement of changing their angles from fully overlap to fully open position during each 360 degree rotation of the turbine.

4. Self-directed Vertical Axis Wind Turbine of claim 1, is scalable as per need based on wind velocity in a specific area or required power output desired.

5. Self-directed Vertical Axis Wind Turbine of claim 1, could be mounted at lower heights between 3 to 10 meters from ground and produce optimum power or torque.

6. Self-directed Vertical Axis Wind Turbine of claim 1, the blades have aerodynamic edges which will minimize edge friction with wind and reduce noise.

7. Self-directed Vertical Axis Wind Turbine of claim 1, the distal edge of the blades will never exceed the speed of the wind it is facing thus reducing noise generated by it.

8. Self-directed Vertical Axis Wind Turbine of claim 1, has a self directing weathervane facing the wind flow direction to produce optimum power or torque from the blades.

\* \* \* \* \*